No. 617,033. Patented Jan. 3, 1899.
F. W. MAXSON.
MACHINE FOR REPAIRING PNEUMATIC TIRES.
(Application filed May 31, 1898.)
(No Model.) 2 Sheets—Sheet 1.
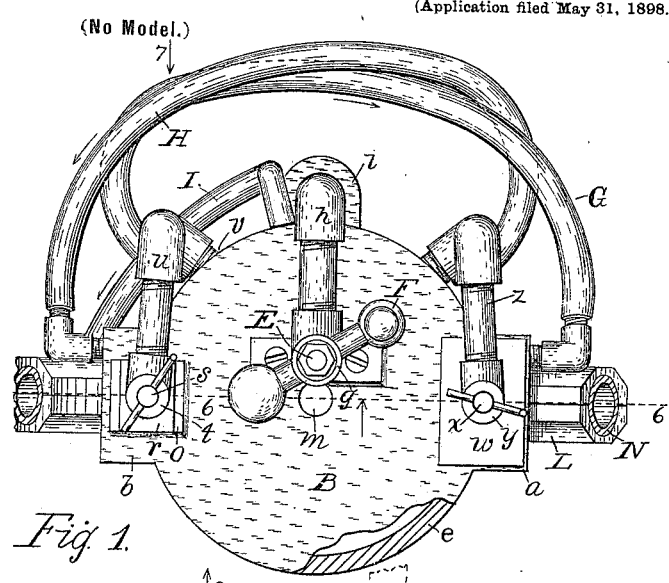
Fig. 1.
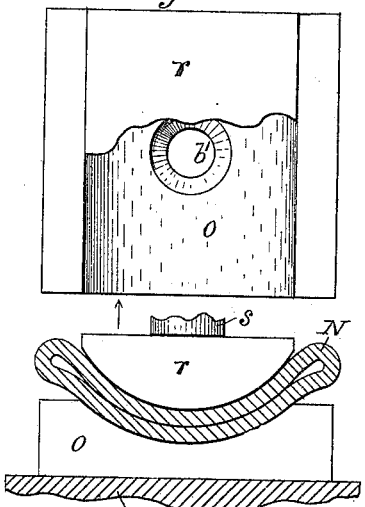
Fig. 4.
Fig. 5.
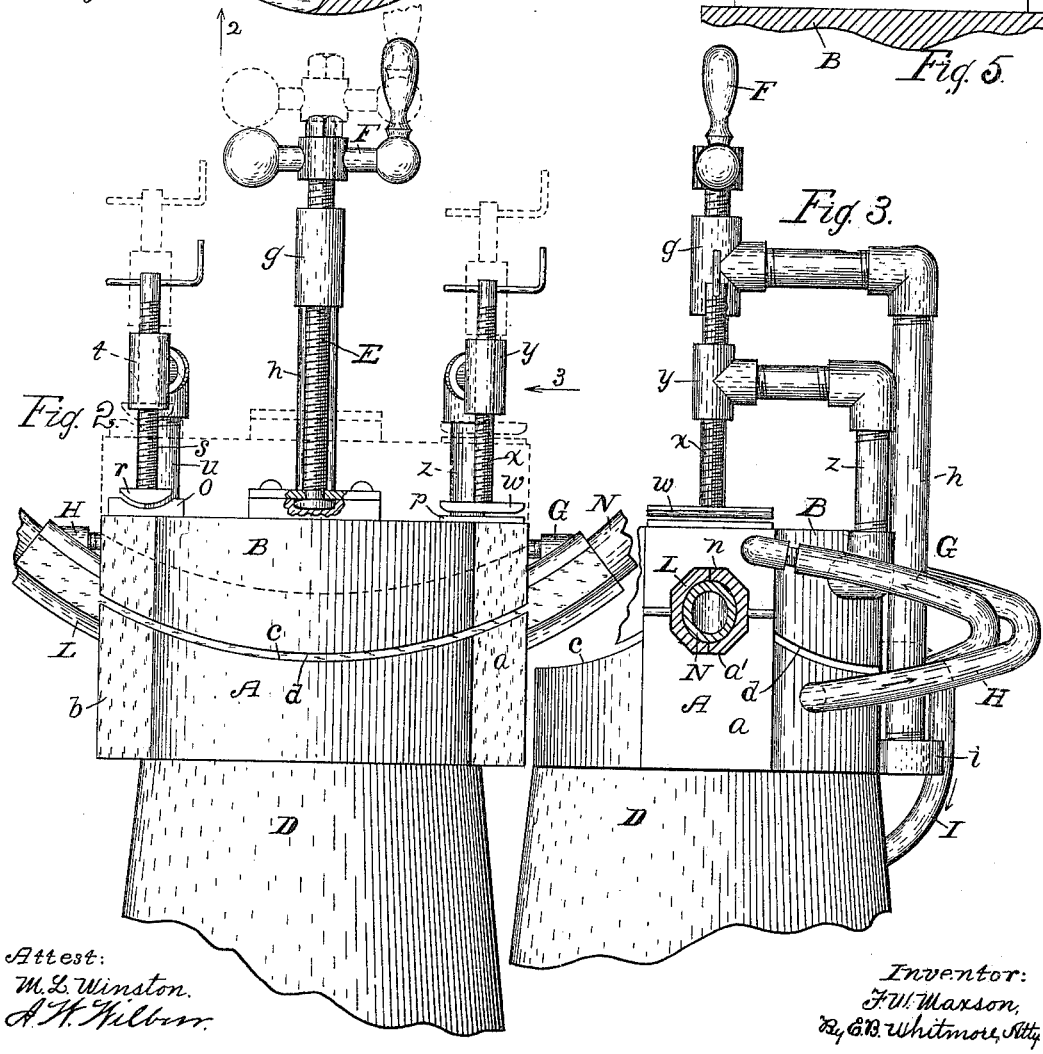
Fig. 2.
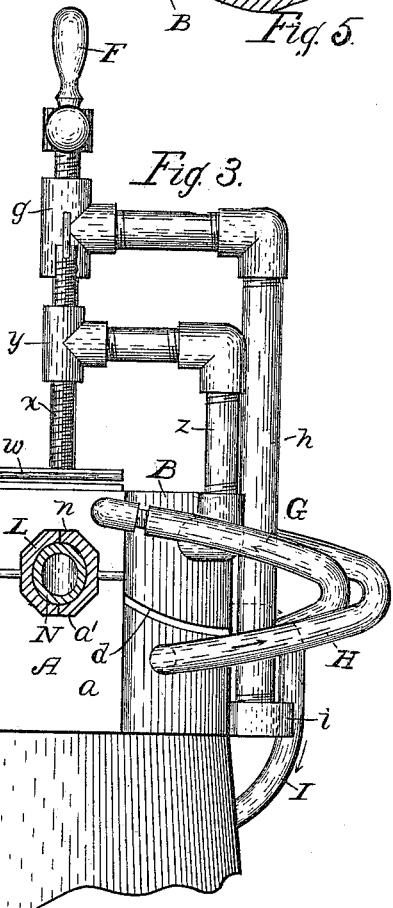
Fig. 3.
Attest:
M. L. Winston.
A. H. Kilburn.
Inventor:
F. W. Maxson,
By E. B. Whitmore, Atty.
THE NORRIS PETERS CO., PHOTO-LITHO., WASHINGTON, D. C.

No. 617,033. Patented Jan. 3, 1899.
F. W. MAXSON.
MACHINE FOR REPAIRING PNEUMATIC TIRES.
(Application filed May 31, 1898.)
(No Model.) 2 Sheets—Sheet 2.
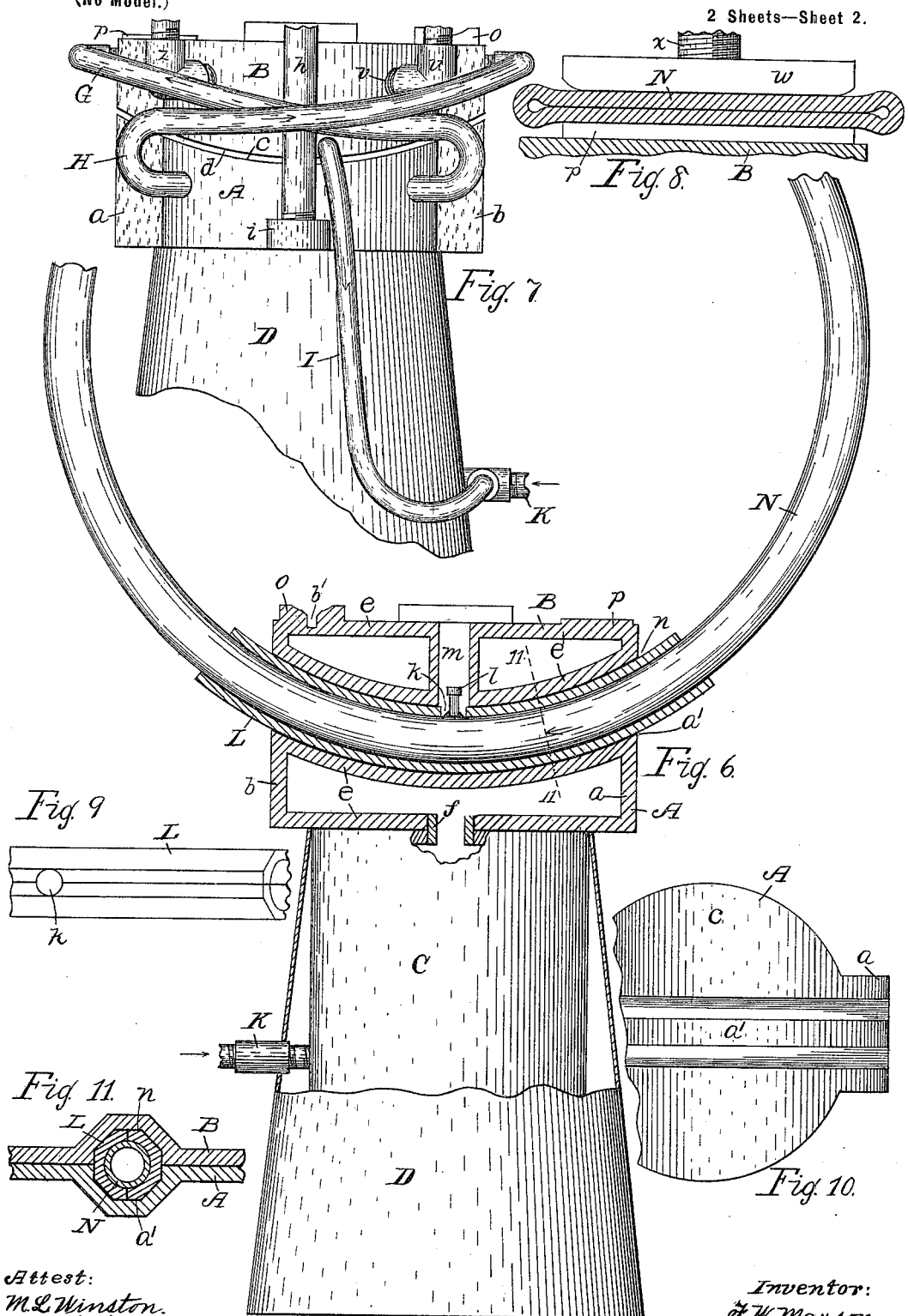
Attest:
M. L. Winston.
A. H. Wilbur.
Inventor:
F. W. Maxson.
By E. B. Whitmore,
Atty.

UNITED STATES PATENT OFFICE.

FRANK W. MAXSON, OF ROCHESTER, NEW YORK.

MACHINE FOR REPAIRING PNEUMATIC TIRES.

SPECIFICATION forming part of Letters Patent No. 617,033, dated January 3, 1899.

Application filed May 31, 1898. Serial No. 682,190. (No model.)

*To all whom it may concern:*

Be it known that I, FRANK W. MAXSON, a citizen of the United States, residing at Rochester, in the county of Monroe and State of New York, have invented a new and useful Improvement in Machines for Repairing Pneumatic Tires, which improvement is fully set forth in the following specification and shown in the accompanying drawings.

The india-rubber pneumatic tires of the wheels of bicycles or other vehicles employing such tires are frequently punctured or become cut or torn from use and require to be repaired or patched for the purpose of making them again air-tight. Also the valve-stems through which the tires are inflated frequently become loose or get to leaking and require repairing or, if need be, replacement by new ones. The patches, which are of india-rubber-faced cloth, have to be vulcanized or welded to place by the action of heat on the outer or the inner surface of the tire, and the valve-stems, whether patched or renewed, require to be secured to place by being heated and pressed.

The object of my invention is to provide a machine for conveniently and rapidly patching such tires and replacing the valve-stems with the aid of steam heat, said machine being provided with molds and dies or pressing-forms necessary and suitable for the work.

The invention is hereinafter fully described, and more particularly pointed out in the claims.

Referring to the drawings, Figure 1 is a view looking down on top of the device. Fig. 2 is a front elevation, seen as indicated by arrow 2 in Fig. 1, parts being broken away and other parts shown in various positions by full and dotted lines. Fig. 3 is a side elevation of the device, seen as indicated by arrows 3 in Fig. 2, parts being broken away. Fig. 4 is a plan of the curved die or plate, a part of the follower being broken away. Fig. 5 is an end view of the curved die, seen as indicated by arrow in Fig. 4, the tire being shown in cross-section. Fig. 6 is a front view, the device being mainly in vertical axial section, parts being broken away and other parts omitted. Fig. 7 is a rear view of the device, seen as indicated by arrow 7 in Fig. 1, parts being broken away and other parts omitted. Fig. 8 is a front view of the flat die, the compressed tire being shown in cross-section. Fig. 9 is a view of the upper surface of the mold, partly broken away. Fig. 10 is a view of the upper surface of the lower steam-chamber, partly broken away. Fig. 11 is a cross-section of the mold and adjacent parts of the steam-chambers, taken on the dotted line 11 11 in Fig. 6. Figs. 4, 5, and 8 are drawn full size, the remaining figures being drawn to a scale one-fourth size.

Referring to the drawings, A is an iron steam-chamber, and B a similar steam-chamber over and independent of the chamber A and coacting therewith. These chambers are alike in plan, being in the main cylindrical with vertical rectangular wings or extensions $a$ $b$ at the right and the left sides. The upper surface $c$ of the chamber A is curved to the form of the surface of a cylinder whose axis is at right angles with the vertical axis of the chamber, and the opposing surface $d$ of the chamber B is similarly curved, said surface $d$ being convex and the surface $c$ being concave, as shown. The walls $e$ of the two chambers are of a thickness sufficient to withstand the internal pressure of steam, which for repairing these tires is kept at about eighty pounds to the square inch, the temperature of the chambers being 320°, more or less.

The lower or stationary chamber A is connected by a pipe $f$ with some suitable steam boiler or generator C, through which to receive a supply of steam under pressure. This steam-generator may be of any suitable kind or pattern, or steam may be brought to the machine from a steam-boiler located anywhere in the building for heating purposes or for other uses through pipes in the usual manner. However, I prefer to have a steam-generator especially for and adjacent to the machine, preferably beneath it, as shown, inclosed by a suitable jacket or inclosing device D, which at the same time constitutes a support or stand for the machine and serving to hold it at a convenient elevation.

The upper or movable steam-chamber B is held at the lower end of a vertical screw E, threaded in a nut $g$, some distance above the chamber. This nut is supported in place by a standard $h$, rigidly secured in a horizontal ledge $i$ of the chamber A, as shown. The screw is provided with a crank F, by means of which to turn it to raise or lower the chamber B, as may be required. Flexible pipes G H are provided for connecting the interiors of the steam-chambers A B for conveying steam from the former to the latter. These pipes being yielding or flexible and occupying positions approaching horizontality admit of free vertical motions for the chamber B, as effected by the screw E. One end of each pipe is connected with the two opposite sides of the movable steam-chamber B, the pipes being carried, approximately, half around the chambers, crossing at the rear of the machine, with their other ends connected with the stationary steam-chamber A. A drip-pipe I is also provided for the chamber B to convey condensed steam back to the boiler through the ordinary water-supply pipe $k$ or in other convenient manner. The drip from the chamber A is through the connecting-pipe $f$.

L is an iron sectional mold in which to receive and hold the inflated tire N for the purpose of patching or repairing, as shown in Fig. 6. This mold is curved longitudinally to conform to the curvature of the tire, and it is divided vertically and longitudinally into two equal and similar parts or sections to permit of the tire being placed therein, as shown. The steam-chambers A B are formed with diametrical opposing channels $a'$ and $n$, respectively, Figs. 3, 6, and 10, in their curved meeting faces $c$ $d$, in which to receive the mold L. These channels are curved longitudinally concentric with said curved faces $c$ $d$ and to conform with the curvature of the mold. The latter is preferably made octagonal in cross-section as to its exterior, as shown, the channels $a'$ and $n$ corresponding in form with the mold. The interior curved space or bore of the mold is circular in cross-section, corresponding with the rounded form of the tire when inflated. The mold is formed with an orifice $k$ in its upper concave side to make room for the valve-stem $l$ of the tire, should the patching in any case need to be done near said valve-stem. This mold is employed when the nature of the work is such that the tire needs to be inflated when the patch is vulcanized to place—as, for instance, when both an internal and an external patch are to be applied to cover the same puncture or fault in the tire. The upper steam-chamber is formed with a central vertical opening or passage $m$, Figs. 1 and 6, leading from its upper surface to the channel $n$, over and corresponding with the orifice $k$ in the mold, the valve-stem $l$ reaching upward into said tubular opening $m$. When the tire is in the position shown in Fig. 6, a short tube or pipe connected with the valve-stem and extending upward through the opening $m$ permits of the tire being inflated by the ordinary means.

In applying patches in some cases and in replacing valve-stems the tire is exhausted of air and flattened out with the sides together. To provide for this work, I construct the machine with a curved plate or die $o$, Figs. 1, 2, and 5, and a flat plate or die $p$, Figs. 1, 2, and 8, both on the upper surface of the steam-chamber B. The die $o$ is over or on top of the left extension $b$ of the steam-chamber, and the flat die $p$ is at the top of the right extension $a$, said extensions of the steam-chambers being made partly for the purpose of providing for these dies, but more especially to give a greater length of bearing for the mold L between the chambers A B.

The die $o$ is provided with a curved follower $r$, controlled by a vertical screw $s$, adapted to turn in a nut $t$. This nut is supported by a standard $u$, secured rigidly to the chamber B at $v$. By turning the screw $s$ in the nut one way or the other the follower may be either raised or else caused to firmly press the collapsed tire N, as shown in Fig. 5, for the purpose of patching around the valve-stem or securing a new one in place. The die $p$ is likewise provided with a flat follower $w$, controlled by a screw $x$, adapted to turn in a nut $y$. This nut is rigidly connected with the section B by the bent arm or standard $z$. By turning the screw $x$ in one direction or the other the follower $w$ may be either raised or forced downward to press the flattened tire N, as shown in Fig. 8. The followers $r$ and $w$ are connected with the respective screws so as to have horizontal swivel motion thereon, so that when the screws are turned the followers shall not partake of such motion. Also, the main lifting-screw E for the steam-chamber B is formed to turn freely in its bearing with said steam-chamber.

The boiler or generator C may be, it will be understood, provided with the usual pressure-indicator, water-gage, safety-valve, and other devices for safety and convenience common to other steam-generators. By employing steam heat for this work the danger of burning or overheating the tires or patches is avoided, which is liable to occur when sources of stronger heat—such as gas-flame, for example—are employed.

When using the mold L, it, with the contained slack tire, is inserted sidewise into place between the steam-chambers, the upper chamber being previously raised by the screw E sufficiently high to admit of this placing of the mold. The upper chamber is subsequently brought down against the mold to moderately press it so that it shall be heated above and below and on both sides.

When patching around a valve-stem or when replacing such part, the slack or exhausted tire is placed to have the stem project downward into the cavity $b'$ of the die $o$, the tire being then pressed, as shown in Fig. 5.

The flat die or plate $p$ is used to secure a flat patch on the outside of the tire, the latter being exhausted with its sides flattened.

What I claim as my invention is—

1. A machine for repairing tires, consisting of a pair of independent coacting steam-chambers one being movable toward or from the other, and a mold for the tire, adapted to be held between said steam-chambers, substantially as set forth.

2. A machine for repairing tires, comprising a stationary steam-chamber and a coacting movable steam-chamber, and a mold for the tire, adapted to be pressed between said steam-chambers, the opposing faces of the steam-chambers being formed with channels or rests for said mold, substantially as shown and described.

3. A pneumatic-tire patching or repairing machine comprising a stationary steam-chamber and a coacting movable steam-chamber, and a longitudinally-divided mold for the tire, adapted to be held between said steam-chambers, said mold being curved both longitudinally and transversely to conform with the inflated tire, the opposing faces of the steam-chambers being curved to correspond with the longitudinal curvature of the mold, substantially as set forth.

4. A tire-patching machine comprising two coacting heating chambers or bodies, one being movable, the opposing faces of said bodies being concave and convex respectively, and a curved mold for the tire, adapted to be pressed between said steam-chambers, provided with an opening through its side, and an opening in the adjacent heating-body coacting with said opening in the side of the mold, substantially as and for the purpose specified.

5. A machine for patching tires, having a pair of coacting heating chambers or bodies, one being movable toward or from the other, and a curved mold for the tire, adapted to be held between said heating chambers or bodies, the opposing faces of said chambers or bodies being correspondingly curved, each formed with a curved channel or rest for receiving said mold, the curves of said mold, the channels and the meeting faces of the heating-bodies, being concentric, substantially as shown.

6. A tire-repairing machine comprising a stationary steam-chamber and a coacting movable steam-chamber, with means for supplying steam to said chambers, and for operating the movable steam-chamber, and two flexible steam-pipes having one end of each connected with the two opposite sides of said movable steam-chamber, their other ends being connected with the stationary steam-chamber, said pipes forming substantially semicircles around the steam-chambers and crossing at the rear thereof, substantially as shown.

In witness whereof I have hereunto set my hand, this 27th day of May, 1898, in the presence of two subscribing witnesses.

FRANK W. MAXSON.

Witnesses:
ENOS B. WHITMORE,
M. L. WINSTON.